W. P. HORTON.

Nut-Locks.

No. 134,204. Patented Dec. 24, 1872.

Witnesses:
P. C. Dieterich
W. A. Graham

Inventor:
William P. Horton
Per Munn & Co
Attorneys.

UNITED STATES PATENT OFFICE.

WILLIAM P. HORTON, OF MILWAUKEE, WISCONSIN.

IMPROVEMENT IN NUT-LOCKS.

Specification forming part of Letters Patent No. 134,204, dated December 24, 1872.

*To all whom it may concern:*

Figure 1:
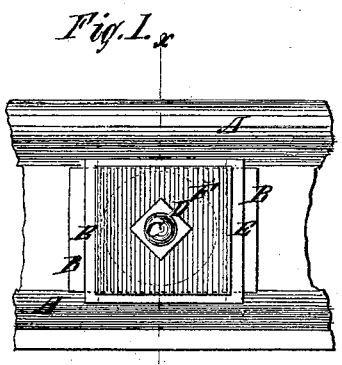
Figure 2:
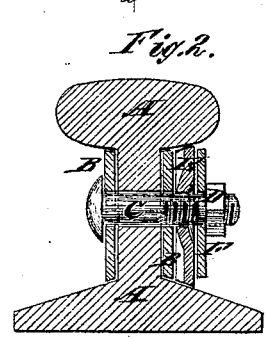
Figure 3:
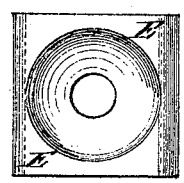

Be it known that I, WILLIAM P. HORTON, of Milwaukee, in the county of Milwaukee and State of Wisconsin, have invented a new and useful Improvement in Nut-Lock, of which the following is a specification:

Figure 1 is a side view of a portion of a railroad rail to which my improved nut-lock has been applied. Fig. 2 is a detail cross-section of the same taken through the line $x\,x$, Fig. 1. Fig. 3 is a detail view of the outer side of the recessed or hollowed block.

My invention comprises a recessed block and a metal plate applied thereto so as to operate in a peculiar manner, both being arranged upon the screw-bolt, all as hereinafter described.

A represents a railroad rail. B represents the fish-plates. C, the bolt, and D the nut, of a railroad-rail joint, about the construction of which parts there is nothing new. E is a block of wood or metal, which has a hole formed through its center for the passage of the bolt C. The inner side of the block E may be round, oval, or flat, and its outer side has a rounded concavity or recess formed in it, as shown in Figs. 2 and 3. F is a steel plate, which has a hole formed through its center to receive the bolt C, and may be round, square, or of any other desired form. The steel plate F is placed upon the bolt C, between the recessed block E and the nut D, as shown in Fig. 2.

By this construction, when the nut D is screwed up the spring-plate F is sprung into the recess of the block E, more or less according to the power applied to said nut D, the pressure of the nut upon the plate F acting from the outer edges toward the center, and the elasticity of said plate acting from the center toward its edges.

By this construction the force of the jarring will be taken up by the elasticity of the plate F, and cannot force the nut off, while at the same time the nut may be turned off readily by the power that turned it on. It will also be observed that the friction being mainly at edge of the nut, there is, therefore, much less danger of its being jarred off or turned loose on the bolt, from any cause, than if the friction were around its central perforation.

Having thus described my invention, I claim as new and desire to secure by Letters Patent—

The combination, with the bolt C and nut D, of the block E, recessed upon its outer side, and the metallic spring-plate F applied thereto, as hereinbefore described.

WILLIAM P. HORTON.

Witnesses:
G. McWHORTER,
SOLON C. KEMON.